United States Patent
Harel et al.

(10) Patent No.: US 8,797,969 B1
(45) Date of Patent: Aug. 5, 2014

(54) IMPLEMENTING MULTI USER MULTIPLE INPUT MULTIPLE OUTPUT (MU MIMO) BASE STATION USING SINGLE-USER (SU) MIMO CO-LOCATED BASE STATIONS

(71) Applicant: Magnolia Broadband Inc., Englewood, NJ (US)

(72) Inventors: Haim Harel, New York, NY (US);
Kenneth Kludt, San Jose, CA (US);
Phil F. Chen, Denville, NJ (US);
Sherwin J. Wang, Towaco, NJ (US)

(73) Assignee: Magnolia Broadband Inc., Englewood, NJ (US)

( * ) Notice: Subject to any disclaimer, the term of this patent is extended or adjusted under 35 U.S.C. 154(b) by 0 days.

(21) Appl. No.: 14/172,500

(22) Filed: Feb. 4, 2014

Related U.S. Application Data

(63) Continuation-in-part of application No. 13/888,057, filed on May 6, 2013.

(60) Provisional application No. 61/762,486, filed on Feb. 8, 2013, provisional application No. 61/811,751, filed on Apr. 14, 2013, provisional application No. 61/845,270, filed on Jul. 11, 2013, provisional application No. 61/898,817, filed on Nov. 1, 2013.

(51) Int. Cl.
*H04Q 7/00* (2006.01)
*H04Q 7/24* (2006.01)

(52) U.S. Cl.
USPC .......................................... 370/328; 370/338

(58) Field of Classification Search
USPC .......... 370/203, 208, 280, 328, 329, 338, 339
See application file for complete search history.

(56) References Cited

U.S. PATENT DOCUMENTS

| | | | |
|---|---|---|---|
| 4,044,359 A | 8/1977 | Applebaum et al. | |
| 4,079,318 A | 3/1978 | Kinoshita | |

(Continued)

FOREIGN PATENT DOCUMENTS

| | | |
|---|---|---|
| EP | 1 867 177 | 5/2010 |
| EP | 2 234 355 | 9/2010 |

(Continued)

OTHER PUBLICATIONS

Office Action issued by the United States Patent and Trademark Office for U.S. Appl. No. 13/630,146 dated Jan. 22, 2013.

(Continued)

*Primary Examiner* — Hong Cho
(74) *Attorney, Agent, or Firm* — Pearl Cohen Zedek Latzer Baratz LLP

(57) ABSTRACT

A system that implements multi user multiple inputs multiple outputs (MU MIMO) base station using a plurality of co-located single-user (SU) MIMO base stations is provided herein. The system may include a number N co-located single-user multiple input multiple output (SU-MIMO) bases stations each having a number K MIMO rank, wherein said N co-located SU-MIMO base stations are configured to share a common antennas array, operating over a common frequency band; a front-end MIMO processor connected to said N co-located SU-MIMO base stations and further coupleable to said common antennas array; and a back-end coordinator configured to collaboratively assist in optimizing operation of said N co-located SU-MIMO base stations, such that said N co-located SU-MIMO base stations and said front-end MIMO processor collaboratively implement a multi-user multiple input multiple output (MU-MIMO) base station capable of dynamically separating a coverage area into N*K spatial channels.

23 Claims, 9 Drawing Sheets

(56) References Cited

U.S. PATENT DOCUMENTS

| | | | |
|---|---|---|---|
| 4,359,738 A | 11/1982 | Lewis | |
| 4,540,985 A | 9/1985 | Clancy et al. | |
| 4,628,320 A | 12/1986 | Downie | |
| 5,162,805 A | 11/1992 | Cantrell | |
| 5,363,104 A | 11/1994 | Richmond | |
| 5,444,762 A | 8/1995 | Frey et al. | |
| 5,732,075 A | 3/1998 | Tangemann et al. | |
| 5,915,215 A | 6/1999 | Williams et al. | |
| 5,940,033 A | 8/1999 | Locher et al. | |
| 6,018,317 A | 1/2000 | Dogan et al. | |
| 6,046,655 A | 4/2000 | Cipolla | |
| 6,101,399 A | 8/2000 | Raleigh et al. | |
| 6,215,812 B1 | 4/2001 | Young et al. | |
| 6,226,507 B1 | 5/2001 | Ramesh et al. | |
| 6,230,123 B1 | 5/2001 | Mekuria et al. | |
| 6,297,772 B1 | 10/2001 | Lewis | |
| 6,321,077 B1 | 11/2001 | Saitoh et al. | |
| 6,377,783 B1 | 4/2002 | Lo et al. | |
| 6,584,115 B1 | 6/2003 | Suzuki | |
| 6,697,633 B1 | 2/2004 | Dogan et al. | |
| 6,834,073 B1 | 12/2004 | Miller et al. | |
| 6,927,646 B2 | 8/2005 | Niemi | |
| 6,975,582 B1 | 12/2005 | Karabinis et al. | |
| 6,987,958 B1 | 1/2006 | Lo et al. | |
| 7,068,628 B2 | 6/2006 | Li et al. | |
| 7,177,663 B2 | 2/2007 | Axness et al. | |
| 7,257,425 B2 | 8/2007 | Wang et al. | |
| 7,299,072 B2 | 11/2007 | Ninomiya | |
| 7,392,015 B1 | 6/2008 | Farlow et al. | |
| 7,499,109 B2 | 3/2009 | Kim et al. | |
| 7,606,528 B2 | 10/2009 | Mesecher | |
| 7,719,993 B2 | 5/2010 | Li et al. | |
| 7,742,000 B2 | 6/2010 | Mohamadi | |
| 7,769,107 B2 | 8/2010 | Sandhu et al. | |
| 7,898,478 B2 | 3/2011 | Niu et al. | |
| 7,970,366 B2 | 6/2011 | Arita et al. | |
| 8,078,109 B1 | 12/2011 | Mulcay | |
| 8,115,679 B2 | 2/2012 | Falk | |
| 8,155,613 B2 | 4/2012 | Kent et al. | |
| 8,280,443 B2 | 10/2012 | Tao et al. | |
| 8,294,625 B2 | 10/2012 | Kittinger et al. | |
| 8,306,012 B2 | 11/2012 | Lindoff et al. | |
| 8,315,671 B2 | 11/2012 | Kuwahara et al. | |
| 8,369,436 B2 | 2/2013 | Stirling-Gallacher | |
| 8,509,190 B2 | 8/2013 | Rofougaran | |
| 8,520,657 B2 | 8/2013 | Rofougaran | |
| 8,526,886 B2 | 9/2013 | Wu et al. | |
| 8,599,955 B1 | 12/2013 | Kludt et al. | |
| 8,599,979 B2 | 12/2013 | Farag et al. | |
| 8,649,458 B2 | 2/2014 | Kludt et al. | |
| 2001/0029326 A1 | 10/2001 | Diab et al. | |
| 2001/0038665 A1 | 11/2001 | Baltersee et al. | |
| 2002/0051430 A1 | 5/2002 | Kasami et al. | |
| 2002/0065107 A1 | 5/2002 | Harel et al. | |
| 2002/0085643 A1 | 7/2002 | Kitchener et al. | |
| 2002/0107013 A1 | 8/2002 | Fitzgerald | |
| 2002/0115474 A1 | 8/2002 | Yoshino et al. | |
| 2003/0114162 A1 | 6/2003 | Chheda et al. | |
| 2003/0153322 A1 | 8/2003 | Burke et al. | |
| 2003/0203717 A1 | 10/2003 | Chuprun et al. | |
| 2004/0056795 A1 | 3/2004 | Ericson et al. | |
| 2004/0121810 A1 | 6/2004 | Goransson et al. | |
| 2004/0125899 A1 | 7/2004 | Li et al. | |
| 2004/0125900 A1 | 7/2004 | Liu et al. | |
| 2004/0166902 A1 | 8/2004 | Castellano et al. | |
| 2004/0228388 A1 | 11/2004 | Salmenkaita | |
| 2004/0235527 A1 | 11/2004 | Reudink et al. | |
| 2005/0068230 A1 | 3/2005 | Munoz et al. | |
| 2005/0068918 A1 | 3/2005 | Mantravadi et al. | |
| 2005/0075140 A1 | 4/2005 | Famolari | |
| 2005/0129155 A1 | 6/2005 | Hoshino | |
| 2005/0147023 A1 | 7/2005 | Stephens et al. | |
| 2005/0245224 A1 | 11/2005 | Kurioka | |
| 2005/0250544 A1 | 11/2005 | Grant et al. | |
| 2005/0287962 A1 | 12/2005 | Mehta et al. | |
| 2006/0041676 A1 | 2/2006 | Sherman | |
| 2006/0094372 A1 | 5/2006 | Ahn et al. | |
| 2006/0135097 A1 | 6/2006 | Wang et al. | |
| 2006/0227854 A1 | 10/2006 | McCloud et al. | |
| 2006/0264184 A1 | 11/2006 | Li et al. | |
| 2006/0270343 A1 | 11/2006 | Cha et al. | |
| 2006/0271969 A1 | 11/2006 | Takizawa et al. | |
| 2006/0285507 A1 | 12/2006 | Kinder et al. | |
| 2007/0076675 A1 | 4/2007 | Chen | |
| 2007/0093261 A1 | 4/2007 | Hou et al. | |
| 2007/0152903 A1 | 7/2007 | Lin et al. | |
| 2007/0223380 A1 | 9/2007 | Gilbert et al. | |
| 2008/0043867 A1 | 2/2008 | Blanz et al. | |
| 2008/0051037 A1 | 2/2008 | Molnar et al. | |
| 2008/0144737 A1 | 6/2008 | Naguib | |
| 2008/0165732 A1 | 7/2008 | Kim et al. | |
| 2008/0238808 A1 | 10/2008 | Arita et al. | |
| 2008/0280571 A1 | 11/2008 | Rofougaran et al. | |
| 2008/0285637 A1 | 11/2008 | Liu et al. | |
| 2009/0028225 A1 | 1/2009 | Runyon et al. | |
| 2009/0046638 A1 | 2/2009 | Rappaport et al. | |
| 2009/0058724 A1 | 3/2009 | Xia et al. | |
| 2009/0121935 A1 | 5/2009 | Xia et al. | |
| 2009/0154419 A1* | 6/2009 | Yoshida et al. | 370/330 |
| 2009/0190541 A1 | 7/2009 | Abedi | |
| 2009/0268616 A1 | 10/2009 | Hosomi | |
| 2009/0322610 A1 | 12/2009 | Hants et al. | |
| 2009/0322613 A1 | 12/2009 | Bala et al. | |
| 2010/0002656 A1 | 1/2010 | Ji et al. | |
| 2010/0037111 A1 | 2/2010 | Ziaja et al. | |
| 2010/0040369 A1 | 2/2010 | Zhao et al. | |
| 2010/0117890 A1* | 5/2010 | Vook et al. | 342/174 |
| 2010/0135420 A1 | 6/2010 | Xu et al. | |
| 2010/0150013 A1 | 6/2010 | Hara et al. | |
| 2010/0172429 A1 | 7/2010 | Nagahama et al. | |
| 2010/0195560 A1 | 8/2010 | Nozaki et al. | |
| 2010/0234071 A1 | 9/2010 | Shabtay et al. | |
| 2010/0278063 A1 | 11/2010 | Kim et al. | |
| 2010/0283692 A1 | 11/2010 | Achour et al. | |
| 2010/0285752 A1 | 11/2010 | Lakshmanan et al. | |
| 2010/0303170 A1 | 12/2010 | Zhu et al. | |
| 2010/0316043 A1 | 12/2010 | Doi et al. | |
| 2011/0019639 A1 | 1/2011 | Karaoguz et al. | |
| 2011/0032849 A1 | 2/2011 | Yeung et al. | |
| 2011/0032972 A1 | 2/2011 | Wang et al. | |
| 2011/0105036 A1 | 5/2011 | Rao et al. | |
| 2011/0150050 A1 | 6/2011 | Trigui et al. | |
| 2011/0150066 A1 | 6/2011 | Fujimoto | |
| 2011/0163913 A1 | 7/2011 | Cohen et al. | |
| 2011/0205883 A1 | 8/2011 | Mihota | |
| 2011/0228742 A1 | 9/2011 | Honkasalo et al. | |
| 2011/0249576 A1 | 10/2011 | Chrisikos et al. | |
| 2011/0273977 A1 | 11/2011 | Shapira et al. | |
| 2011/0281541 A1 | 11/2011 | Borremans | |
| 2011/0299437 A1 | 12/2011 | Mikhemar et al. | |
| 2012/0014377 A1 | 1/2012 | Joergensen et al. | |
| 2012/0015603 A1 | 1/2012 | Proctor et al. | |
| 2012/0020396 A1 | 1/2012 | Hohne et al. | |
| 2012/0033761 A1 | 2/2012 | Guo et al. | |
| 2012/0034952 A1 | 2/2012 | Lo et al. | |
| 2012/0045003 A1* | 2/2012 | Li et al. | 375/260 |
| 2012/0064821 A1 | 3/2012 | Miao et al. | |
| 2012/0076028 A1* | 3/2012 | Ko et al. | 370/252 |
| 2012/0170672 A1 | 7/2012 | Sondur | |
| 2012/0201153 A1 | 8/2012 | Bharadia et al. | |
| 2012/0201173 A1 | 8/2012 | Jain et al. | |
| 2012/0207256 A1 | 8/2012 | Farag et al. | |
| 2012/0212372 A1 | 8/2012 | Petersson et al. | |
| 2012/0218962 A1* | 8/2012 | Kishiyama et al. | 370/329 |
| 2012/0220331 A1 | 8/2012 | Luo et al. | |
| 2012/0230380 A1 | 9/2012 | Keusgen et al. | |
| 2012/0251031 A1 | 10/2012 | Suarez et al. | |
| 2012/0270544 A1 | 10/2012 | Shah | |
| 2012/0314570 A1* | 12/2012 | Forenza et al. | 370/230 |
| 2013/0010623 A1 | 1/2013 | Golitschek | |
| 2013/0023225 A1 | 1/2013 | Weber | |
| 2013/0051283 A1 | 2/2013 | Lee et al. | |
| 2013/0070741 A1 | 3/2013 | Li et al. | |
| 2013/0079048 A1 | 3/2013 | Cai et al. | |

(56) References Cited

U.S. PATENT DOCUMENTS

| | | |
|---|---|---|
| 2013/0094621 A1 | 4/2013 | Luo et al. |
| 2013/0101073 A1 | 4/2013 | Zai et al. |
| 2013/0156120 A1 | 6/2013 | Josiam et al. |
| 2013/0170388 A1 | 7/2013 | Ito et al. |
| 2013/0208619 A1 | 8/2013 | Kudo et al. |
| 2013/0223400 A1 | 8/2013 | Seo et al. |
| 2013/0242976 A1 | 9/2013 | Katayama et al. |
| 2013/0272437 A1 | 10/2013 | Eidson et al. |
| 2013/0331136 A1 | 12/2013 | Yang et al. |

FOREIGN PATENT DOCUMENTS

| | | |
|---|---|---|
| JP | 2009-278444 | 11/2009 |
| WO | WO 03/047033 | 6/2003 |
| WO | WO 03/073645 | 9/2003 |
| WO | WO 2010/085854 | 8/2010 |
| WO | WO 2011/060058 | 5/2011 |

OTHER PUBLICATIONS

Office Action issued by the United States Patent and Trademark Office for U.S. Appl. No. 13/630,146 dated Mar. 27, 2013.
Office Action issued by the United States Patent and Trademark Office for U.S. Appl. No. 13/762,159 dated Apr. 16, 2013.
Office Action issued by the United States Patent and Trademark Office for U.S. Appl. No. 13/762,191 dated May 2, 2013.
Office Action issued by the United States Patent and Trademark Office for U.S. Appl. No. 13/762,188 dated May 15, 2013.
Office Action issued by the United States Patent and Trademark Office for U.S. Appl. No. 13/776,204 dated May 21, 2013.
Office Action issued by the United States Patent and Trademark Office for U.S. Appl. No. 13/770,255 dated Jun. 6, 2013.
Office Action issued by the United States Patent and Trademark Office for U.S. Appl. No. 13/776,068 dated Jun. 11, 2013.
Notice of Allowance issued by the United States Patent and Trademark Office for U.S. Appl. No. 13/762,159 dated Jun. 20, 2013.
Office Action issued by the United States Patent and Trademark Office for U.S. Appl. No. 13/775,886 dated Jul. 17, 2013.
Notice of Allowance issued by the United States Patent and Trademark Office for U.S. Appl. No. 13/762,191 dated Jul. 19, 2013.
Notice of Allowance issued by the United States Patent and Trademark Office for U.S. Appl. No. 13/630,146 dated Jul. 31, 2013.
Notice of Allowance issued by the United States Patent and Trademark Office for U.S. Appl. No. 13/762,188 dated Aug. 19, 2013.
Notice of Allowance issued by the United States Patent and Trademark Office for U.S. Appl. No. 13/770,255 dated Sep. 17, 2013.
Ahmadi-Shokouh et al., "Pre-LNA Smart Soft Antenna Selection for MIMO Spatial Multiplexing/Diversity System when Amplifier/Sky Noise Dominates", European Transactions on Telecommunications, Wiley & Sons, Chichester, GB, vol. 21, No. 7, Nov. 1, 2010, pp. 663-677.
Office Action issued by the United States Patent and Trademark Office for U.S. Appl. No. 13/889,150 dated Sep. 25, 2013.
Office Action issued by the United States Patent and Trademark Office for U.S. Appl. No. 13/955,320 dated Oct. 15, 2013.
Office Action issued by the United States Patent and Trademark Office for U.S. Appl. No. 13/776,204 dated Oct. 23, 2013.
Office Action issued by the United States Patent and Trademark Office for U.S. Appl. No. 13/925,454 dated Oct. 28, 2013.
Office Action issued by the United States Patent and Trademark Office for U.S. Appl. No. 13/955,194 dated Oct. 30, 2013.
Office Action issued by the United States Patent and Trademark Office for U.S. Appl. No. 14/013,190 dated Nov. 5, 2013.
Office Action issued by the United States Patent and Trademark Office for U.S. Appl. No. 13/776,068 dated Nov. 5, 2013.
Office Action issued by the United States Patent and Trademark Office for U.S. Appl. No. 14/010,771 dated Dec. 17, 2013.
Office Action issued by the United States Patent and Trademark Office for U.S. Appl. No. 14/065,182 dated Dec. 17, 2013.
Office Action issued by the United States Patent and Trademark Office for U.S. Appl. No. 14/068,863 dated Dec. 17, 2013.
Office Action issued by the United States Patent and Trademark Office for U.S. Appl. No. 14/011,521 dated Dec. 23, 2013.
Office Action issued by the United States Patent and Trademark Office for U.S. Appl. No. 13/775,886 dated Jan. 7, 2014.
Office Action issued by the United States Patent and Trademark Office for U.S. Appl. No. 14/018,965 dated Jan. 13, 2014.
Office Action issued by the United States Patent and Trademark Office for U.S. Appl. No. 13/858,302 dated Jan. 16, 2014.
Office Action issued by the United States Patent and Trademark Office for U.S. Appl. No. 14/042,020 dated Jan. 16, 2014.
Office Action issued by the United States Patent and Trademark Office for U.S. Appl. No. 14/102,539 dated Jan. 27, 2014.
Office Action issued by the United States Patent and Trademark Office for U.S. Appl. No. 14/087,376 dated Jan. 29, 2014.
Notice of Allowance issued by the United States Patent and Trademark Office for U.S. Appl. No. 13/776,204 dated Jan. 31, 2014.
Office Action issued by the United States Patent and Trademark Office for U.S. Appl. No. 14/094,644 dated Feb. 6, 2014.
Notice of Allowance issued by the United States Patent and Trademark Office for U.S. Appl. No. 13/955,320 dated Feb. 21, 2014.
Huang et al., "Antenna Mismatch and Calibration Problem in Coordinated Multi-point Transmission System," IET Communications, 2012, vol. 6, Issue 3, pp. 289-299.
Office Action issued by the United States Patent and Trademark Office for U.S. Appl. No. 14/109,904 dated Feb. 27, 2014.
Office Action issued by the United States Patent and Trademark Office for U.S. Appl. No. 13/925,454 dated Mar. 7, 2014.
Notice of Allowance issued by the United States Patent and Trademark Office for U.S. Appl. No. 14/172,500 dated Mar. 26, 2014.
Notice of Allowance issued by the United States Patent and Trademark Office for U.S. Appl. No. 14/065,182 dated Mar. 25, 2014.
Notice of Allowance issued by the United States Patent and Trademark Office for U.S. Appl. No. 14/068,863 dated Mar. 25, 2014.
Office Action issued by the United States Patent and Trademark Office for U.S. Appl. No. 14/010,771 dated Apr. 4, 2014.
Office Action issued by the United States Patent and Trademark Office for U.S. Appl. No. 14/085,352 dated Apr. 7, 2014.
Office Action issued by the United States Patent and Trademark Office for U.S. Appl. No. 13/889,150 dated Apr. 9, 2014.
Notice of Allowance issued by the United States Patent and Trademark Office for U.S. Appl. No. 13/955,194 dated Apr. 9, 2014.
Office Action issued by the United States Patent and Trademark Office for U.S. Appl. No. 14/097,765 dated Apr. 22, 2014.
Notice of Allowance issued by the United States Patent and Trademark Office for U.S. Appl. No. 14/087,376 dated May 9, 2014.
Office Action issued by the United States Patent and Trademark Office for U.S. Appl. No. 14/143,580 dated May 9, 2014.
Notice of Allowance issued by the United States Patent and Trademark Office for U.S. Appl. No. 13/776,068 dated May 13, 2014.
Office Action issued by the United States Patent and Trademark Office for U.S. Appl. No. 14/013,190 dated May 20, 2014.

* cited by examiner

IMPLEMENTING MULTI USER MULTIPLE INPUT MULTIPLE OUTPUT (MU MIMO) BASE STATION USING SINGLE-USER (SU) MIMO CO-LOCATED BASE STATIONS

CROSS REFERENCE TO RELATED APPLICATIONS

This application is a continuation-in-part application of U.S. patent application Ser. No. 13/888,057, filed on May 6, 2013, which claims benefit of U.S. Provisional Patent Application Nos. 61/762,486, filed on Feb. 8, 2013 and 61/811,751, filed on Apr. 14, 2013; this application further claims benefit of U.S. Provisional Patent Application Nos. 61/845,270, filed on Jul. 11, 2013 and 61/898,817, filed on Nov. 1, 2013, all of which are incorporated in their entirety herein by reference.

FIELD OF THE INVENTION

The present invention relates generally to multi user multiple input multiple outputs (MU MIMO) base stations, and more specifically, such base stations which are implementing MU MIMO using time division duplex (TDD).

BACKGROUND OF THE INVENTION

Prior to setting forth a short discussion of the related art, it may be helpful to set forth definitions of certain terms that will be used hereinafter.

The term "Small Cell" as used herein is defined as a low-powered radio access node, or base station that operates in licensed spectrum that have a range of 10 meters to 1 or 2 kilometers, compared to a mobile macrocell which might have a range of a few tens of kilometers. Small cells are a vital element to 3G/4G data off-loading, and many mobile network operators see small cells as vital to managing Long Term Evolution (LTE) advanced spectrum more efficiently compared to using just macrocells. The primary use of small cells is to increase capacity of the traffic for the operators rather than increase the mere coverage of the network.

The term "multiple-input-multiple-output" or "MIMO" as used herein, is defined as the use of multiple antennas at both the transmitter and receiver. MIMO systems may improve communication performance by offering significant increases in data throughput and link range without additional bandwidth or increased transmit power. MIMO systems may achieve this goal by spreading the transmit power over multiple antennas to achieve spatial multiplexing that improves the spectral efficiency (more bits per second per frequency range or hertz (Hz) of bandwidth) or to achieve a diversity gain that improves the link reliability (e.g. reduced fading), or increased antenna directivity.

The term "multi-user multiple-input-multiple-output" or "MU-MIMO" as used herein is defined as a wireless communication system in which available antennas are spread over a multitude of independent access points and independent radio terminals—each having one or multiple antennas. In contrast, single-user MIMO considers a single multi-antenna transmitter communicating with a single multi-antenna receiver. To enhance the communication capabilities of all terminals, MU-MIMO applies an extended version of space-division multiple access (SDMA) to allow multiple transmitters to send separate signals and multiple receivers to receive separate signals simultaneously in the same frequency band.

The term "Time-division duplexing" or "TDD" as used herein is defined as is the application of time-division multiplexing to separate outward and return signals. It emulates full duplex communication over a half-duplex communication link. Time-division duplexing has a strong advantage in the case where there is asymmetry of the uplink and downlink data rates. As the amount of uplink data increases, more communication capacity can be dynamically allocated, and as the traffic load becomes lighter, capacity can be taken away. The same applies in the downlink direction. For radio systems that aren't moving quickly, hereinafter referred to as "quasi-static" stations, another advantage is that the uplink and downlink radio paths are likely to be very similar. This means that techniques such as beamforming work well with TDD systems.

In some MU-MIMO that are already known in the art, a spatial separation mechanism creates multiple separated channels between the base station and the users or the same spectrum; sub sets of users population are assigned to these different spatial channels; a common basestation scheduler makes sure that simultaneous users that may experience MU-MIMO's self-inflicted cross talk, are served over non overlapping PRBs, thus maintaining efficient spectrum multiplexing.

According to prior art MU-MIMO systems, the aggregated data rate of an N-user MIMO is slightly below N times the data rate of a Single-User-MIMO (SU-MIMO), due to random distribution of the users, channel estimation errors, mobility, and the projected signal levels dependence on pairing of users, which impacts MCS estimation accuracy. Such MU-MIMO base stations serve as N unified legacy base stations, sharing common channel estimation and common MIMO processing blocks, as well as common Radio Resources Control (RRC) and a common scheduler.

FIG. 1A is a block diagram of a system 100 and illustrating the function stacks of single-user MIMO system according to the prior art. FIG. 1B is a block diagram illustrating the function stacks of a multi-user MIMO system, according to the prior art. For SU-MIMO, system 100 may include: higher media access control (MAC) 110 may perform scheduling for the MIMO operation; lower MAC 120 which may handle (for example, multiplex, de-multiplex, modulation, and demodulation) the multiple data streams for the MIMO; pre-coding function 130 which may transmit each of the multiple data streams through the multiple transmit antennas according the pre-coding weight.

In order to upgrade the SU-MIMO system into a MU-MIMO system, one may modify the scheduler in higher MAC 110 to a new higher MAC 160 of system 150 to coordinate the multiple users. Additionally, one may multiply the data handling function in lower MAC 120 to newer lower MAC 170, of system 150, to accommodate more users simultaneously. Furthermore, one may modify the pre-coding function 130 to the newer one 180 as in system 150 so that each data stream from all MU-MIMO users may transmit through all the transmit antennas simultaneously.

SUMMARY OF THE INVENTION

The present invention, in embodiments thereof, may provide a system and method which may implement multi user multiple inputs multiple outputs (MU MIMO) base station using single-user (SU) MIMO co-located base stations. Embodiments of the system of the present invention may include a number N co-located single-user multiple input multiple output (SU-MIMO) bases stations each having a number K MIMO rank, wherein said N co-located SU-MIMO base stations are configured to share a common antennas array, operating over a common frequency band; a front-end MIMO processor connected to said N co-located SU-MIMO base stations and further coupleable to said common antennas array; and a back-end coordinator configured to collaboratively assist in optimizing operation of said N co-located SU-MIMO base stations, such that said N co-located SU-MIMO base stations and said front-end MIMO processor collaboratively implement a multi-user multiple input multiple output (MU-MIMO) base station capable of or configured to dynamically (i.e., over time) separating a coverage area (being a portion of space which is covered by the communication service of a base station) into N*K spatial channels. The spatial separation is achieved by using the data from each SU-MIMO base station for making educated requests to them for a better coordination between them.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be more fully understood by reference to the following detailed description when read with the accompanying drawings in which:

Figure 1:
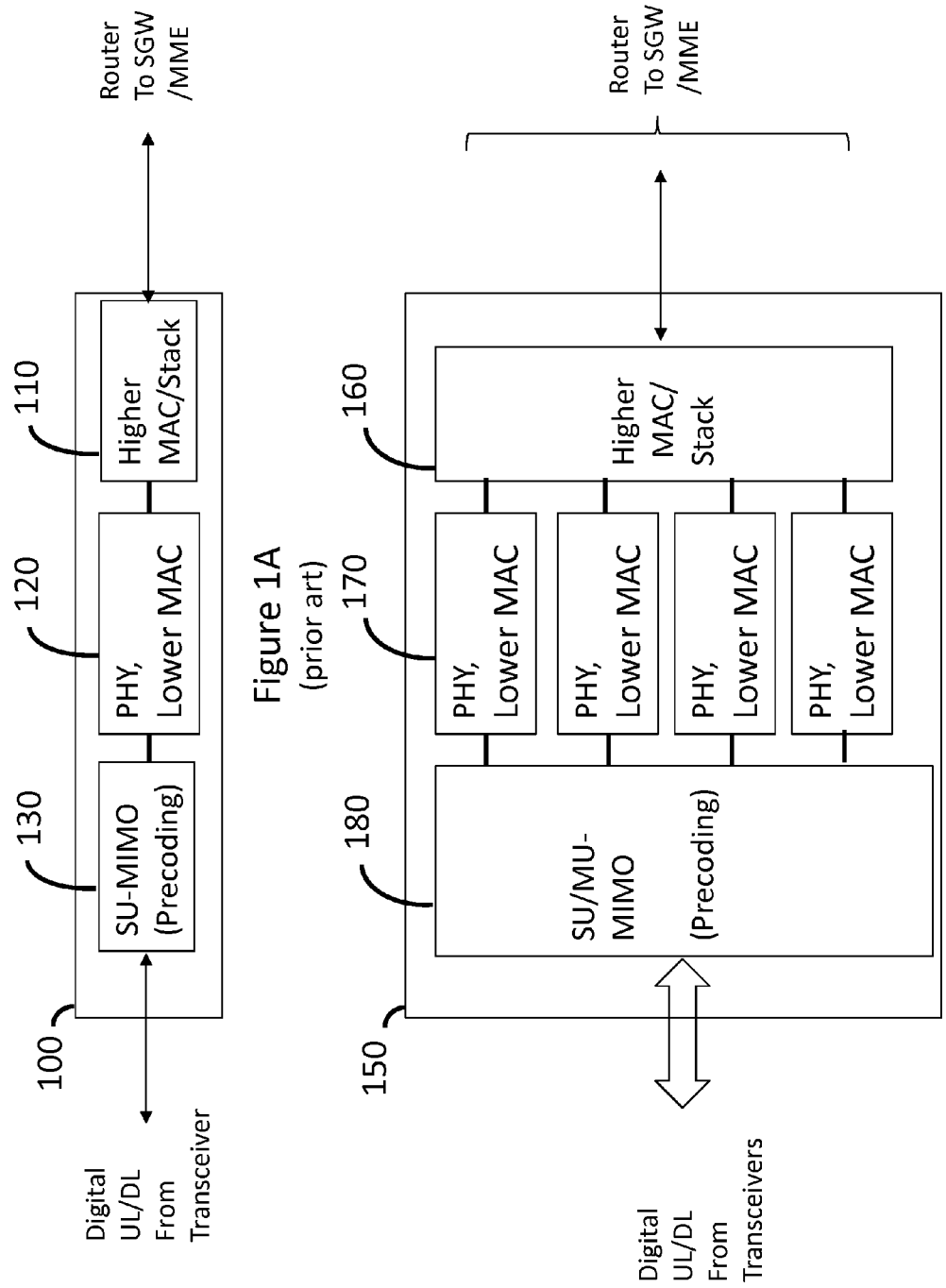
FIGS. 1A and 1B are SU-MIMO and MU-MIMO respectively according to the prior art.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE INVENTION

In the following description, various aspects of the present invention will be described. For purposes of explanation, specific configurations and details are set forth in order to provide a thorough understanding of the present invention. However, it will also be apparent to one skilled in the art that the present invention may be practiced without the specific details presented herein. Furthermore, well known features may be omitted or simplified in order not to obscure the present invention.

Unless specifically stated otherwise, as apparent from the following discussions, it is appreciated that throughout the specification discussions utilizing terms such as "processing," "computing," "calculating," "determining," or the like, refer to the action and/or processes of a computer or computing system, or similar electronic computing device, that manipulates and/or transforms data represented as physical, such as electronic, quantities within the computing system's registers and/or memories into other data similarly represented as physical quantities within the computing system's memories, registers or other such information storage, transmission or display devices.

The term "existing" as used herein relates to devices that are currently available "off the shelf" and are not modified while implemented in a system in accordance with embodiments of the present invention. Examples are existing SU-MIMO base stations which include existing baseband modules, existing schedulers, and existing radio circuits.

The term "collaborative" as used herein relates a manner in which several devices operate while taking into account the actions of the other devices, possibly through a coordinator.

The term "on-site" as used herein relates to operation of a system post deployment in the real-life environment, as opposed to a lab or a factory.

Figure 2:
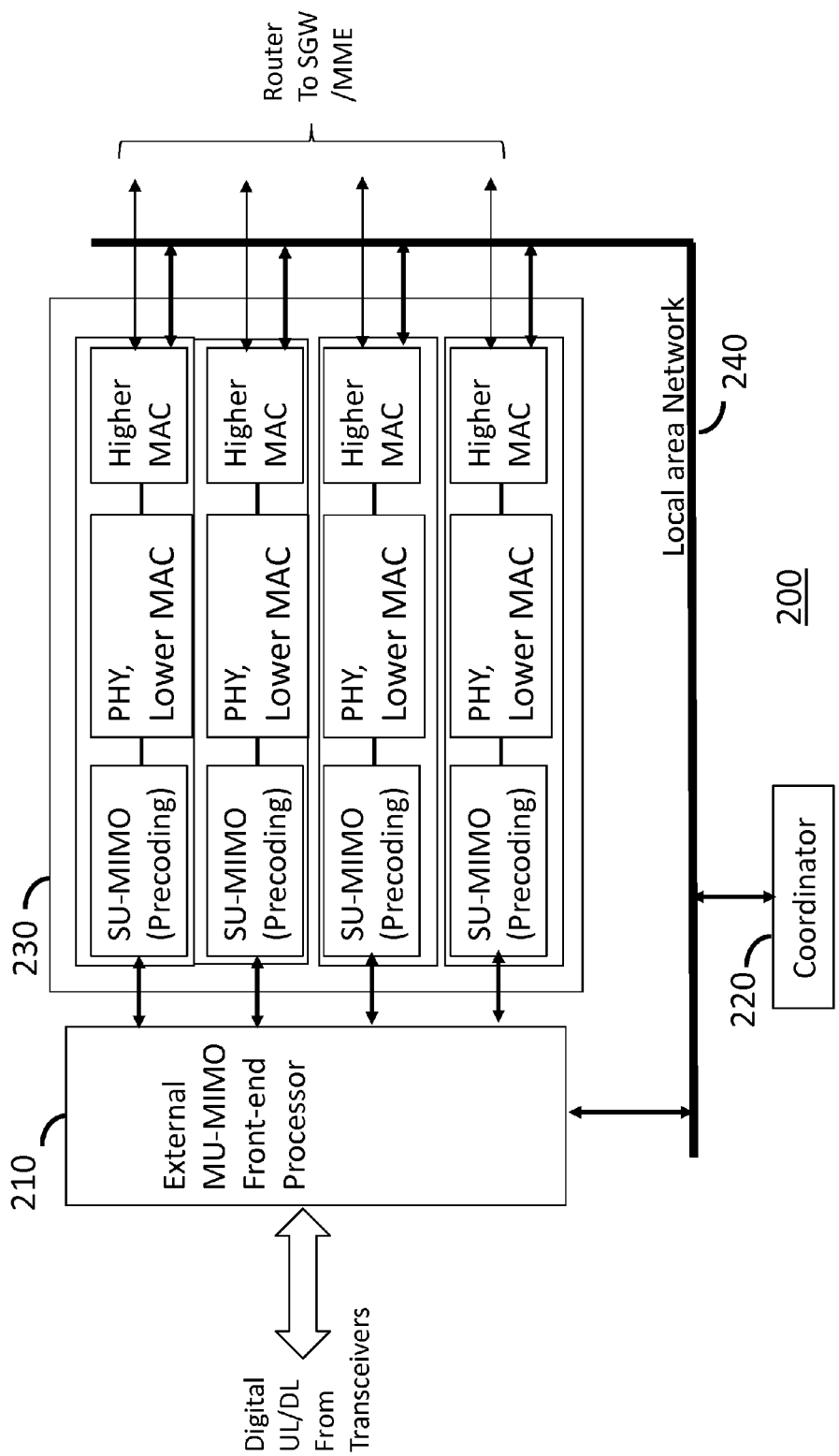
FIG. 2 depicts the function and architecture of a MU-MIMO implementation using a front end processor, a coordinator, and 4 SU-MIMO baseband units in accordance with some embodiments of the present invention.

FIG. 2 shows that the functions modification needed for a MU-MIMO system 200 implementing the MU MIMO using SU-MIMO systems, in accordance with embodiments of the present invention. The MU-MIMO system may be carried by front-end processor 210 and coordinator 220 and leave the functions of the SU-MIMO systems which are co-located in one block 230 with a minimal change.

The functions that may be performed by coordinator 220 are described herein The functions of the bank of co-located SU-MIMO basebands (or base stations) 230 are those of the SU-MIMO bases stations that are currently available. These functions of SU-MIMO may be reused for embodiments of the present invention of creating a MU-MIMO base station with a minimal modification. An interconnection device 240 (for example, a local area network) may provide the interconnection among front-end processor 210, coordinator 220 and bank of co-located SU-MIMO base basebands (or base stations) 230. It should be noted that for the purpose of the present application, co-located base stations are base stations modules that are electronically interconnected and usually packed on a same integrated circuit (IC) or at least same printed circuit board (PCB). Through interconnection 240, each of the co-located basebands may send its scheduling information to the coordinator 220 in advance. Front-end processor 210 may send inseparable user equipment (UE) (not shown) identification (ID) (e.g., those UEs having the crosstalk exceeding a set threshold) to coordinator; coordinator 220 may send the MU-MIMO re-scheduling information to the engaged basebands (or base stations); coordinator 220 may request the engaged basebands (or base stations) to re-schedule their users' assigned resource blocks.

In contrast to a MU MIMO base station that necessitates unique application specific integrated circuit (ASIC), embodiments of the present invention illustrate how it would be possible to build a MU MIMO base station using only readily available components such as SU MIMO ASICs and some logic components such as the front end processor and the back end coordinator. Such as system may include a number N co-located single-user multiple input multiple output (SU-MIMO) bases stations each having a number K MIMO rank, wherein said N co-located SU-MIMO base stations are configured to share a common antennas array, operating over a common (i.e. same) frequency band; a front-end MIMO processor connected to said N co-located SU-MIMO base stations and further coupleable to said common antennas array; and a back-end coordinator configured to collaboratively assist in optimizing operation of said N co-located SU-MIMO base stations, such that said N co-located SU-MIMO base stations and said front-end MIMO processor collaboratively implement a multi-user multiple input multiple output (MU-MIMO) base station capable of or configured to dynamically separating a coverage area into N*K spatial channels.

Figure 3:
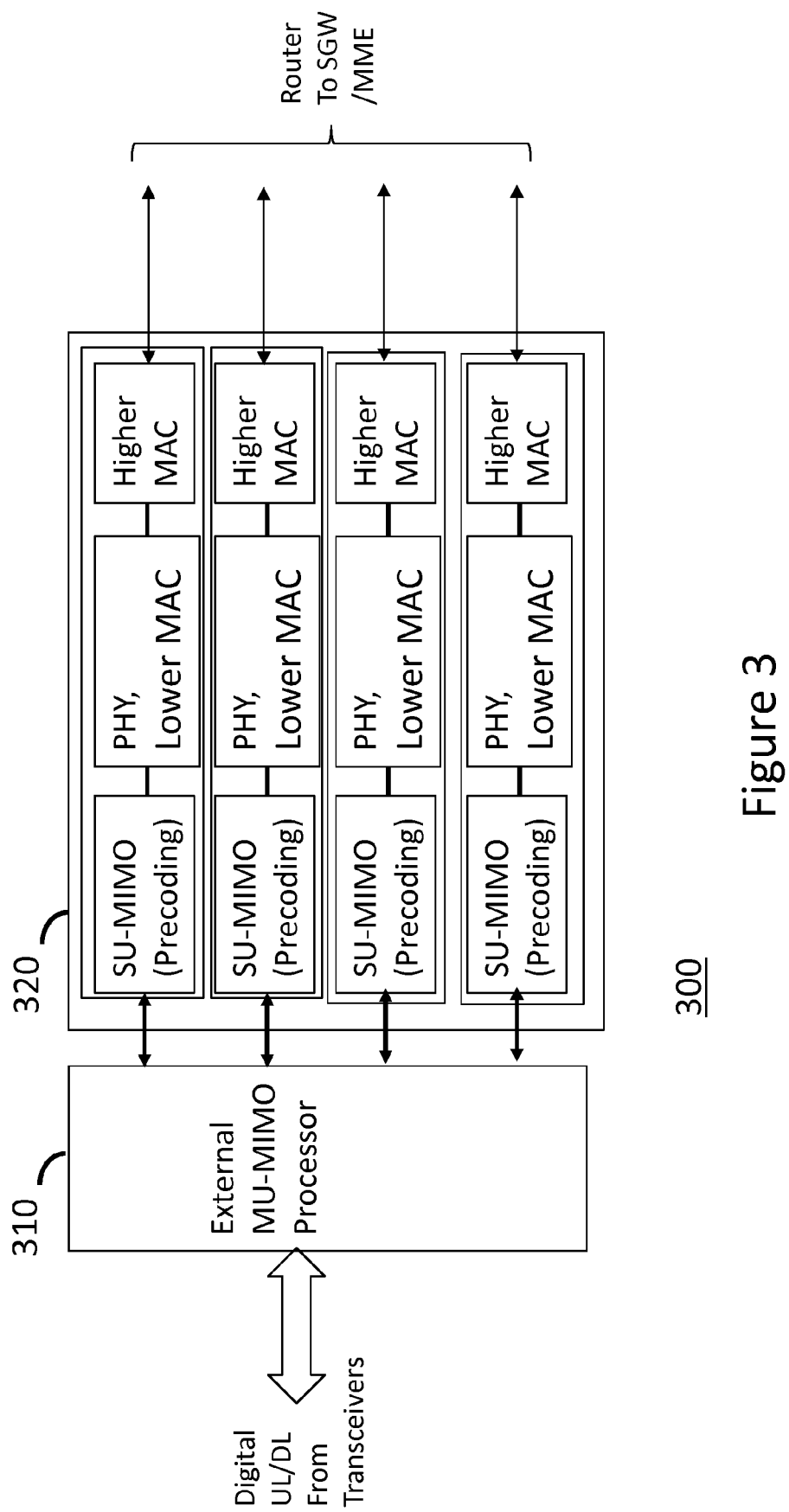
FIG. 3 depicts another aspect a MU-MIMO implementation using a front end processor, and four SU-MIMO baseband units in accordance with some embodiments of the present invention.

FIG. 3 shows the function stack of another MU-MIMO architecture in a system 300 implementing the MU MIMO in accordance with embodiments of the present invention. The MU-MIMO system in accordance with embodiments of the present invention may not need the coordination (i.e., scheduling) among the users for the MU-MIMO operation. External MU-MIMO processor 310 may connect to each of the co-located SU-MIMO basebands (or base stations), 320. Unlike other external MU-MIMO architecture, The external MU-MIMO architecture in accordance with embodiments of the present invention does not equip coordinator to perform scheduling for the multiple users. The non-scheduling external MU-MIMO system may be subject to a performance loss, depending on the MU-MIMO algorithm used.

Figure 4:
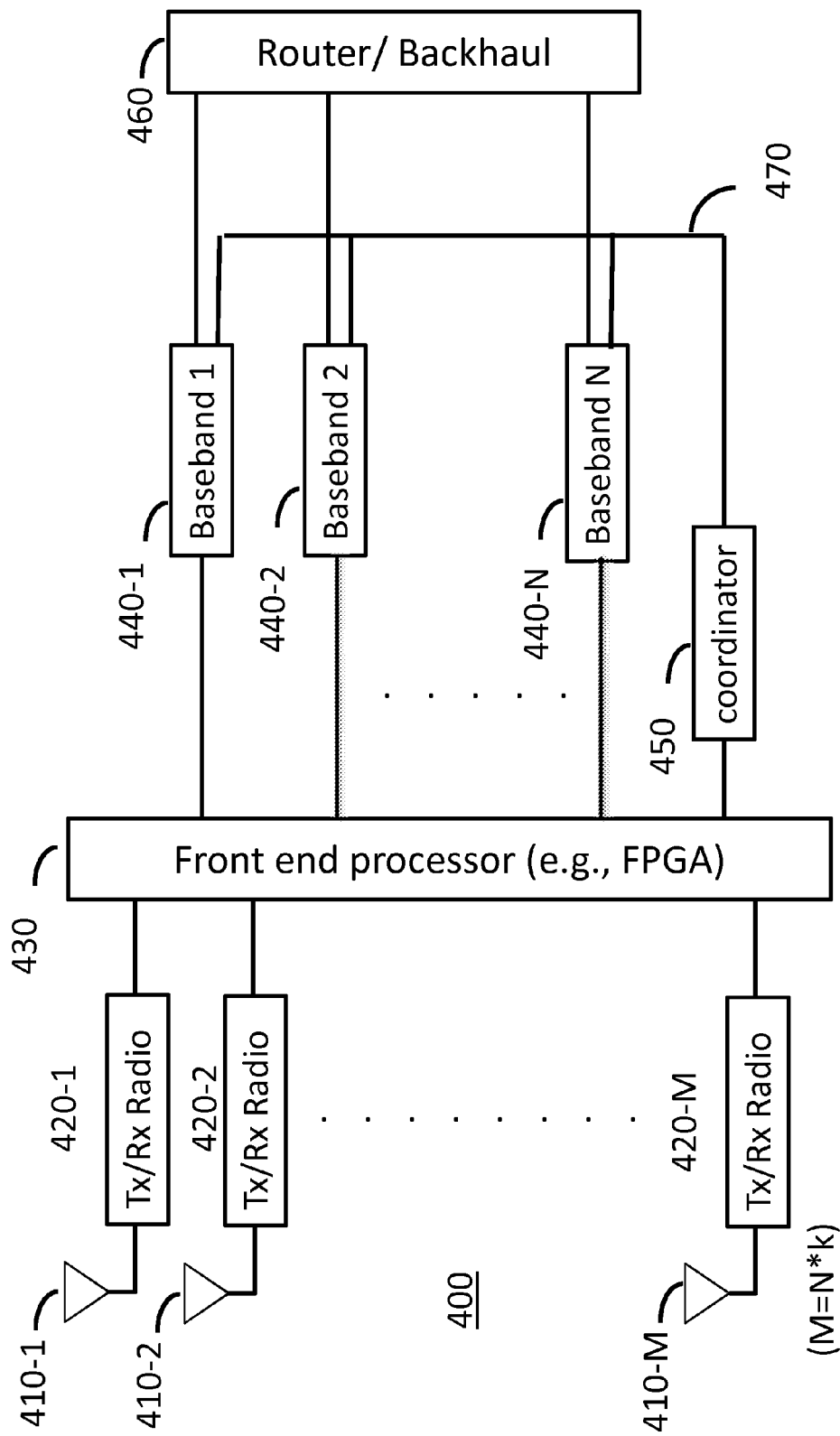
FIG. 4 illustrates a TDD MU-MIMO base station that includes N co-located k ranked SU-MIMO basebands in accordance with some embodiments of the present invention.

FIG. 4 illustrates system 400 implementing a TDD MU-MIMO base station that may include N co-located K ranked SU-MIMO basebands (with at least one baseband on a base station). Each of the N basebands 440-1, 440-2 . . . 440-N may serve many users simultaneously with different resources blocks (frequency channels/time slots). The individual user may be served by one baseband up to k-ranked MIMO (i.e., up to k data streams). These basebands share the M antennas 410-1, 410-2, . . . , 410-M and M transceiver radios 420-1, 420-2, . . . , 420-M) through a front-end processor (for example, a Field Programmable Gate Array—FPGA) 430. M may be larger than or equal to N*K. The front end-end processor 430 may process the digital beam-forming (e.g., precoding) to the transmit signals and process the channel estimation on the received signal for all the users. Coordinator 450, interconnected with all the basebands and the front-end processor 430, may serve scheduler functions of the MU-MIMO operation for the co-located N basebands. The coordinator may be part of the front-end processor. The interconnection 470 may be served by a local area network (LAN). Basebands may connect to the backhaul 460 through interconnection 470.

According to some embodiments of the present invention, the overall system may be operable in a Time Division Duplex (TDD) configuration, wherein each one of said N co-located SU-MIMO base stations has an existing scheduler and wherein said front-end MIMO processor is configured to carry out said dynamic separation based on the existing schedulers.

According to some embodiments of the present invention, each one of said N co-located SU-MIMO base stations has an existing radio module, wherein said front-end processor is further configured to carry out on site, periodic self-calibration on transmit and receive chains of each one of said radio modules or antennas, wherein the self-calibration is usable for establishing channel reciprocity, so that uplink channel information is mapped into downlink channel estimation in a time division duplex (TDD) system.

According to some embodiments of the present invention, each one of said N co-located SU-MIMO base stations has an existing baseband module configured to carry out channel estimation of the channels served by the respective SU-MIMO base stations, and wherein said front-end processor is further configured to carry out channel estimation for all the channels served by said N co-located SU-MIMO base stations.

According to some embodiments of the present invention, the front-end processor may be further configured to: derive identification for each of active user equipment (UE) and map said identifications into respective channel estimations.

According to some embodiments of the present invention, the identification derivation may be based on decoding the UE ID in the front end processor and the respective base station.

According to some embodiments of the present invention, each of said N co-located SU-MIMO base stations has an existing baseband module configured to detect uplink Physical Resource Block (PRB), each PRB being mappable to a distinct reference of frequency/time bins containing orthogonal frequency-division multiplexing OFDM symbols at a given transmit time interval (TTI), wherein said front-end processor is further configured to tag a channel estimation of a user equipment (UE) based on a bin received from said existing baseband modules. User equipment ("UE" or "a UE") may be a device such as a cellular telephone, wireless-capable computer or laptop computer, smartphone, or other wireless or cellular capable device.

Figure 5:
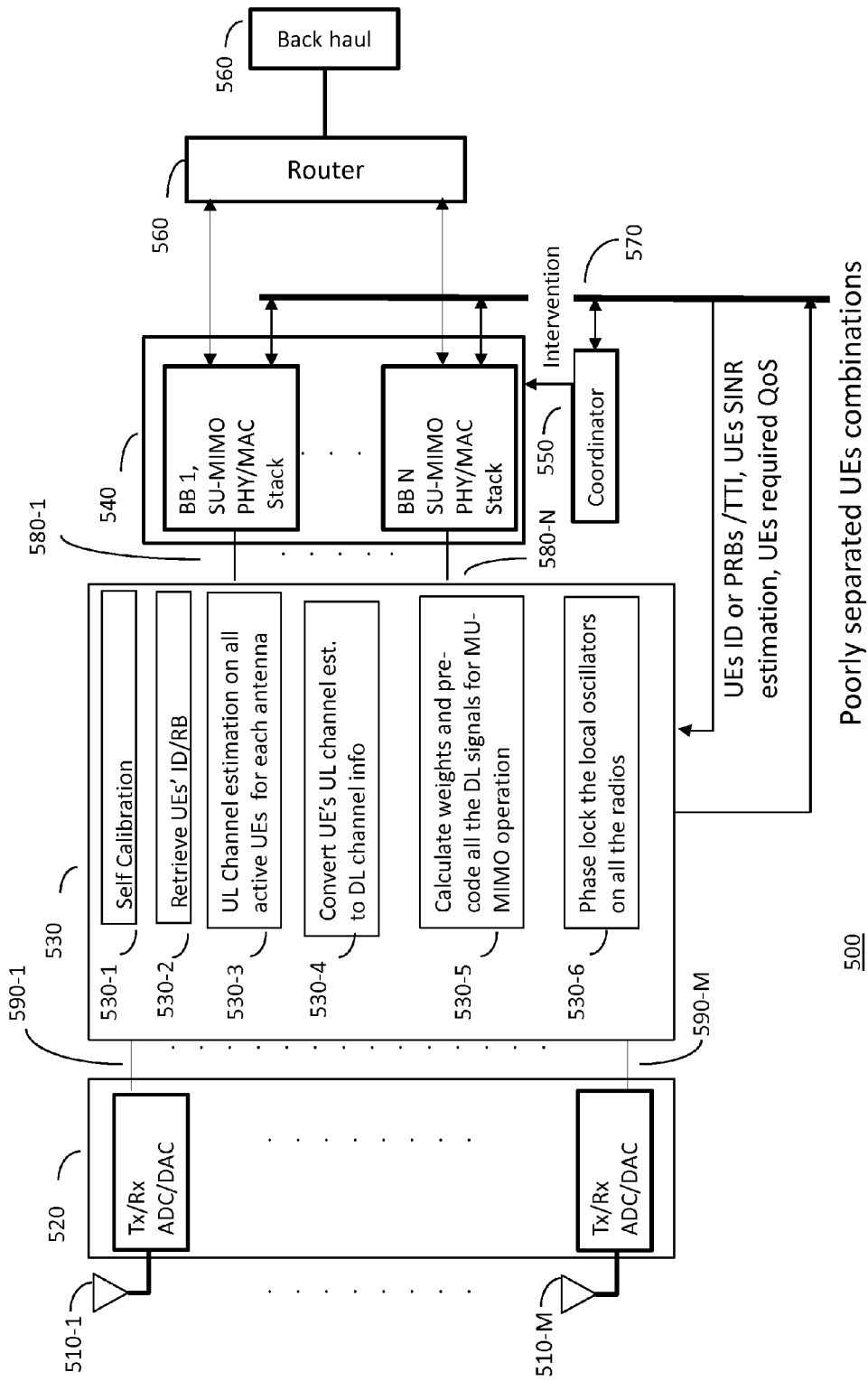
FIG. 5 depicts the function of the front end processor and the associated signal/data flows in accordance with some embodiments of the present invention.

FIG. 5 depicts, in greater detail functionality of system 500 and the function of the front end processor 530 and the associated signal/data flows, according to embodiments of the present invention. The system includes a bank of M transmit/receive antennas 510. Each antenna may be connected to one of the M radios 520. Each radio may include up/down converter, digital-to-analog (DAC) and analog-to-digital (ADC) converters. The system further includes front-end processor 530. Front-end processor may perform the self-calibration on all transmit and receive paths through the radios and antennas 530-1. A TDD system may use the calibration information to apply the channel reciprocity. For example, the calibration information may help converting the uplink channel estimation to the downlink channel information. Front-end processor may retrieve the UEs' Identification (MAC address) and its assigned channel (resources blocks) from the downlink baseband signals 530-2. The UEs ID and their assigned channels are needed for performing MU-MIMO in the case that the information is not passed from baseband in advance. Front-end processor may perform the channel estimation on the uplink (received) signal for all the active UEs 530-3. Front-end processor may convert, with the transmit/receive path calibration data, the uplink channel information (estimation) to the downlink channel information 530-4. With the downlink channel information, the said front-end processor may calculate the downlink crosstalk (or SINR loss) among the active UEs. The said front-end processor may check if pairs of UEs are not suitable for MU-MIMO operation (e.g., their crosstalk (or signal loss) is above a pre-set threshold). Front-end processor may use, with the downlink channel information, any MU-MIMO algorithm (for example, zero-forcing (ZF), minimum mean square error (MMSE), or any proprietary or other suitable algorithm) to calculate the precoding weights (amplitudes and/or phases) for all the data streams and users to minimize the crosstalk in the MU-MIMO operation 530-5. The front-end processor may apply the weights to the signals of the UEs engaged MU-MIMO operation accordingly. Front-end processor may phase lock the local oscillators of all the radios to keep the signal coherency, which may be needed for MIMO operation 530-6.

The bank of collocated baseband 540 is also shown with signal/data connection 580-1 . . . 580-N between the N basebands and the said front-end processor. Each baseband may send the downlink baseband signal to and receive the uplink (received) base band signal from the front-end processor for each active UE.

Signal connection 590-1 . . . 590-M is shown between the M radios and the front-end processor. Both uplink (received) and downlink (transmit) signals in these connections may be set in I and Q quadrature format.

Coordinator 550 may be interconnected with the front end processor and each baseband through, for example, a local area network 570. The coordinator may receive the scheduler information (e.g., UEs' ID and their assigned resource blocks) from each baseband 540 in advance and may obtain the DL channel information of each active UE from the front-end processor 530. With this information, the coordinator may check if there is conflict (for example, the crosstalk exceeding a certain set threshold) among the UEs scheduled for MU-MIMO operation. The said coordinator may resolve a schedule conflict by re-scheduling UEs' assigned resource blocks and inform the associated baseband to prepare the baseband signals for the UEs accordingly. The coordinator may also resolve a schedule conflict by informing the associated baseband to re-schedule the UEs' resource blocks. The function of the said coordinator may be performed by the front-end processor.

According to some embodiments of the present invention, the front-end processor is configured to derive uplink channel information relating to at least some user equipment (UE), wherein said uplink channel estimation is converted to downlink channel information by applying channel reciprocity, and further based on calibration data.

According to some embodiments of the present invention, a communication link established between each base station's baseband and the front end processor, over which schedulers plans are transferred in advance, to the front end processor, using UE ID or UE reference via bin at a given TTI, where said scheduled UEs per TTI, per PRB, are processed by the MU-MIMO mechanism According to some embodiments of the present invention, a front-end processor is configured calculate a downlink precoding weights for at least some user equipment (UE), camped on the base station using said uplink channel information, said calibration data, and a MU-MIMO spatial multiplexing algorithm.

According to some embodiments of the present invention, a communication link between said base stations and the front end processor is used to inform it of a quality of service (QoS) and the signal to interference plus noise (SINR) of each of the scheduled UEs in both down and up links.

According to some embodiments of the present invention, the MU-MIMO processing may take into account: the quality of service (QoS) requirement and the signal to interference plus noise (SINR) levels of the UEs to be scheduled, and choose whether to use Zero Forcing or minimal mean square error (MMSE) algorithms for antennae weights calculation.

According to some embodiments of the present invention, the MU-MIMO uses Zero Forcing (ZF) whenever signal to interference plus noise SINR levels of the user equipment (UEs) to be scheduled are approximately at generic SINR level, where generic means service that could have been provided only to one UE, and the MU-MIMO processing uses minimal mean square error (MMSE) whenever Zero Forcing is not used.

According to some embodiments of the present invention, the MU-MIMO process checks quality of service (QoS) tagging of the scheduled UEs, and if none is set, an MMSE weight calculation is done based on a proportional fairness approach.

According to some embodiments of the present invention, the MU-MIMO process checks quality of service QoS of the schedules UEs, and if all are tagged for the QoS, a minimal mean square error (MMSE) calculation is performed and prospective SINRs are compared to those required by the various QoS, and if found sufficient, the weights calculation is actually used, and if not, one of the UE's service is degraded, so that the other QoS requirements are fulfilled, and if not a second UEs service is degraded.

According to some embodiments of the present invention, wherein the MU-MIMO process checks QoS of the schedules UEs, and if some of the UEs are tagged for QoS and some other are not, then the QoS ones take priority, and the non QoS tagged ones are served according to a proportional fairness approach.

According to some embodiments of the present invention, each one of said N co-located SU-MIMO base stations has an existing baseband module (i.e., the SU-MIMO base band module which is unmodified), and wherein said a back-end coordinator is further configured to receive from said front-end-processor an information regarding poorly separated user equipment (UEs) being UEs that are separated below a predefined level, and notifies at least one of the existing baseband modules to modify a schedule plan.

According to some embodiments of the present invention, wherein each one of said N co-located SU-MIMO base stations has an existing radio module having a local oscillator, wherein said front-end processor is further configured to phase lock on all said local oscillators, in order to achieve phase coherency, sufficient for beamforming.

According to some embodiments of the present invention, the front-end processor is further configured to send user equipment (UE) uplink channel information and UE identification to said back-end coordinator for checking and resolving conflicts occurring whenever a crosstalk level exceeds predefined levels.

According to some embodiments of the present invention, each of said N co-located SU-MIMO base stations has an existing scheduler (the SU-MIMO base scheduler which is unmodified) and wherein said back-end coordinator is further configured to identify poorly separated UEs and handover one or more of them to other base station in the system, and repeat this procedures for other poorly separated UEs, so the occurrence of poorly separated UEs is minimized.

According to some embodiments of the present invention, an intervention (i.e., an action carried out by a processor or a coordination in order to resolve a conflict between several devices) is achieved by allowing some schedulers to proceed as planned, while others are requested to refrain from scheduling a given UE for certain PRBs, over a given up and coming Transmission Time Interval (TTI).

According to some embodiments of the present invention, such handover events are limited to UEs whose history indicated static position, where history is measure in tens of seconds, and where static is defined as channel estimation variation that has approximately zero mean.

According to some embodiments of the present invention, wherein the antenna array comprises M antennas, serving N baseband units each supporting K grade MIMO, where M≥N*K, i.e. the baseband population is sparse, thus increasing the MU-MIMO degrees of freedom and promoting higher and better spatial separation.

Figure 6:
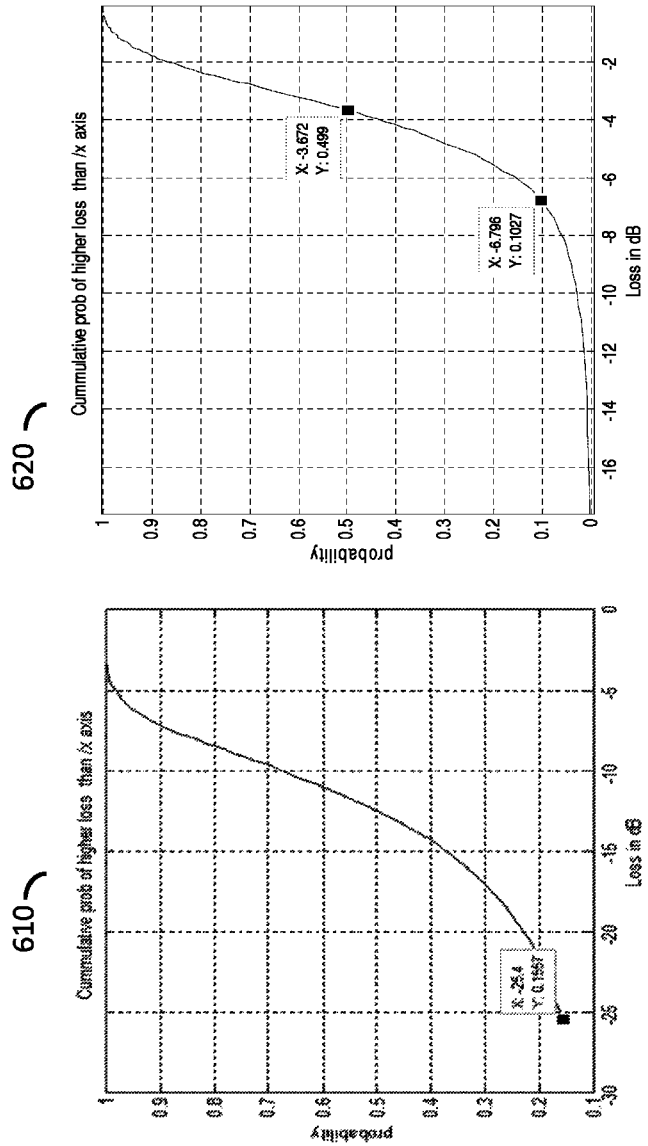
FIG. 6 shows the simulated signal loss for the MU-MIMO system using a zero forcing algorithm without MU-MIMO scheduling.

FIG. 6 shows in a pair of simulation graphs 600 that the simulated signal loss for the non-scheduling MU-MIMO operation using the publicly well-known algorithms, zero-forcing, for the case 610 of antenna numbers being equal to the supported users' data streams (e.g., base station uses 8 antennas–4 pairs of linear polarized antennas to support 4 UEs with rank 2 MIMO) and the case 620 of antenna numbers being twice of the supported data streams (e.g., base station uses 16 antennas–8 pairs linear polarized antennas to support 4 UEs with rank 2 MIMO). This system simulation is based on the use of 80 UE, each UE 2×2 MIMO; Sector of 90°; range of 150 m; NLOS Rayleigh 6 rays; UE quads selected at random; 3,000 drops (runs). The simulation result of 620 shows that 90% of the UEs (data streams) is subject to less than 6.8 dB signal loss, or half of the UEs is subject to less than 3.7 dB signal loss. The simulation results shows that the signal loss may be insignificant for certain systems without MU-MIMO scheduler, compromised for simplicity. A more complicated algorithm, like MMSE or improved proprietary algorithm, may reduce the signal loss further.

Figure 7:
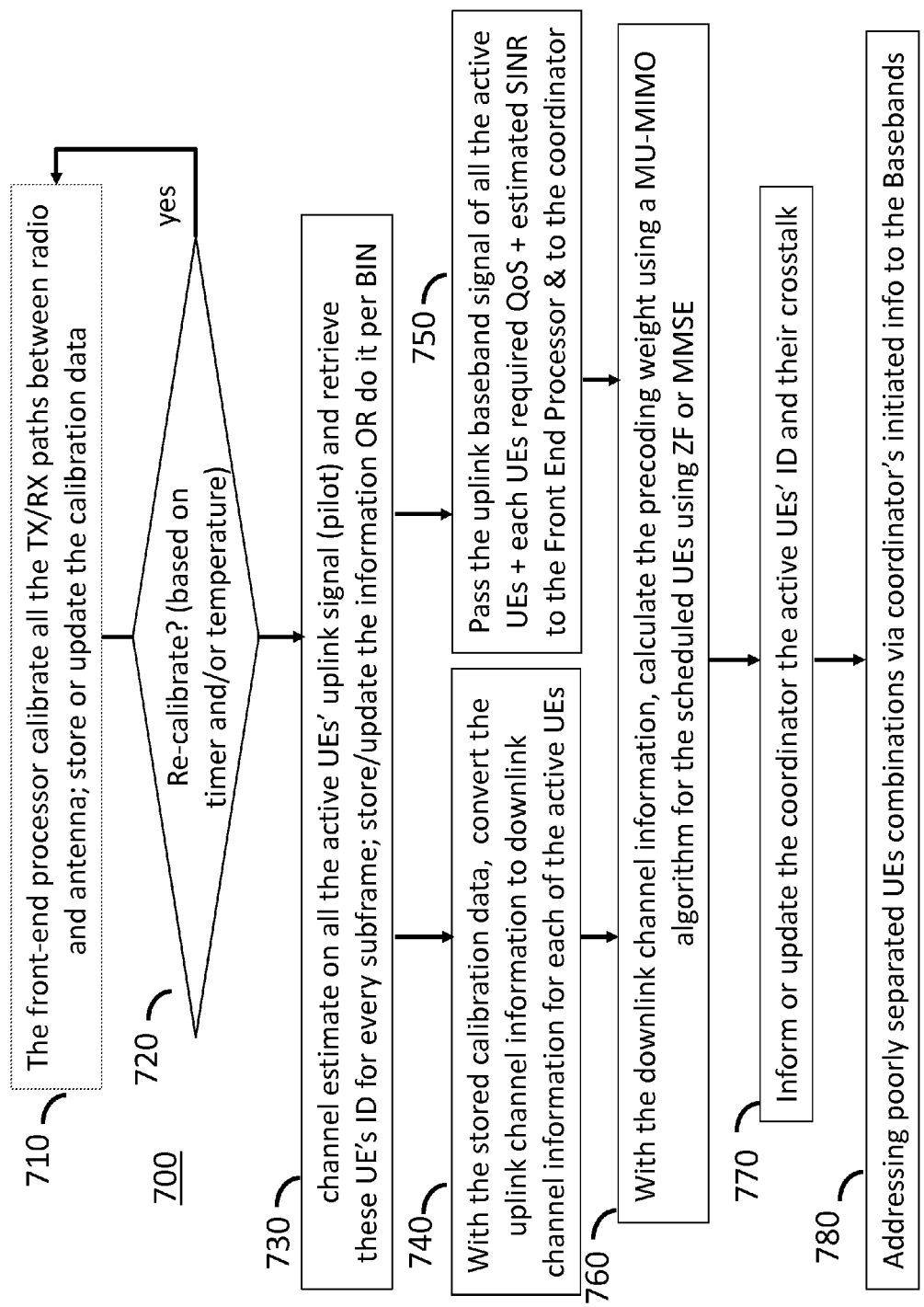
FIG. 7 is a high level flowchart illustrating an aspect in accordance with some embodiments of the present invention.

FIG. 7 700 describes the uplink part MU-MIMO procedure for said the front-end processor in the invented MU-MIMO TDD base station. Step 710 shows that the front-end processor may perform the calibration on transmit and receive paths of all radios/antennas and store or update the calibration data. This processor may repeat the calibration routinely with a pre-set timer and/or based on the temperature change and update the calibration data, shown on step 720. Step 730 shows that the processor may channel estimate on all the uplink signals (pilots) from each of the receive antennas and retrieve the UE's IDs. This information is then stored or updated with the new channel estimation (every sub-frame). With the calibration data, the processor may then convert the uplink channel information into the downlink channel information for the TDD system, shown on Step 740. In addition, step 750 shows that the processor may send the uplink baseband signals to the corresponding served baseband once the UE's IDs are retrieved. Furthermore, step 760 shows that the processor may calculate the pre-coding weights and crosstalk for all the possible UE pairs using a chosen MU-MIMO algorithm (for example, zero-forcing, MMSE, or any proprietary or other suitable algorithm) with the updated downlink channel information. Step 770 shows that the processor may inform the said coordinator the active UE's IDs and their crosstalk. Step 780 shows that poorly separated UEs combinations may be addressed via coordinator's initiated info to the Basebands.

Figure 8:
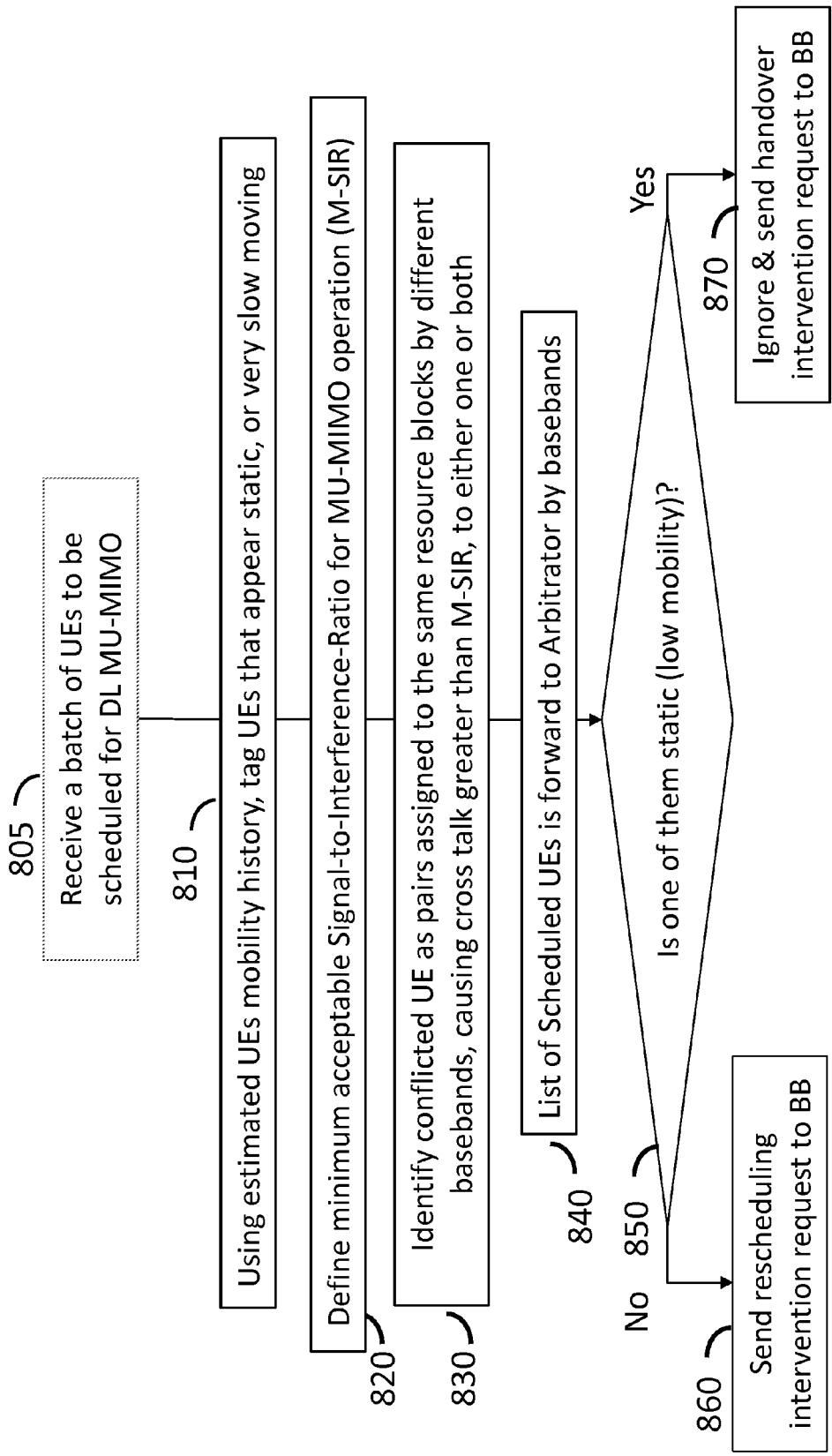
FIG. 8 is a high level flowchart illustrating another aspect in accordance with some embodiments of the present invention.

FIG. 8 is a high level flowchart illustrating another aspect in accordance with some embodiments of the present invention. The procedure may include the following steps: Receiving a batch of UEs to be scheduled for DL MU-MIMO 805; Using estimated UEs mobility history, tag (i.e., assign with an identifier or indicator) UEs that appear static, or very slow moving 810; Defining minimum acceptable Signal-to-Interference-Ratio for MU-MIMO operation (M-SIR) 820; identifying conflicted UE as pairs assigned to the same resource blocks by different basebands, causing cross talk greater than M-SIR, to either one or both 830; List of Scheduled UEs is forward to Arbitrator by basebands 840; Is one of them static (low mobility)? 850. In case no—send rescheduling intervention request to base band 860 and in case yes—ignore and send handover intervention request to baseband 870.

Figure 9:
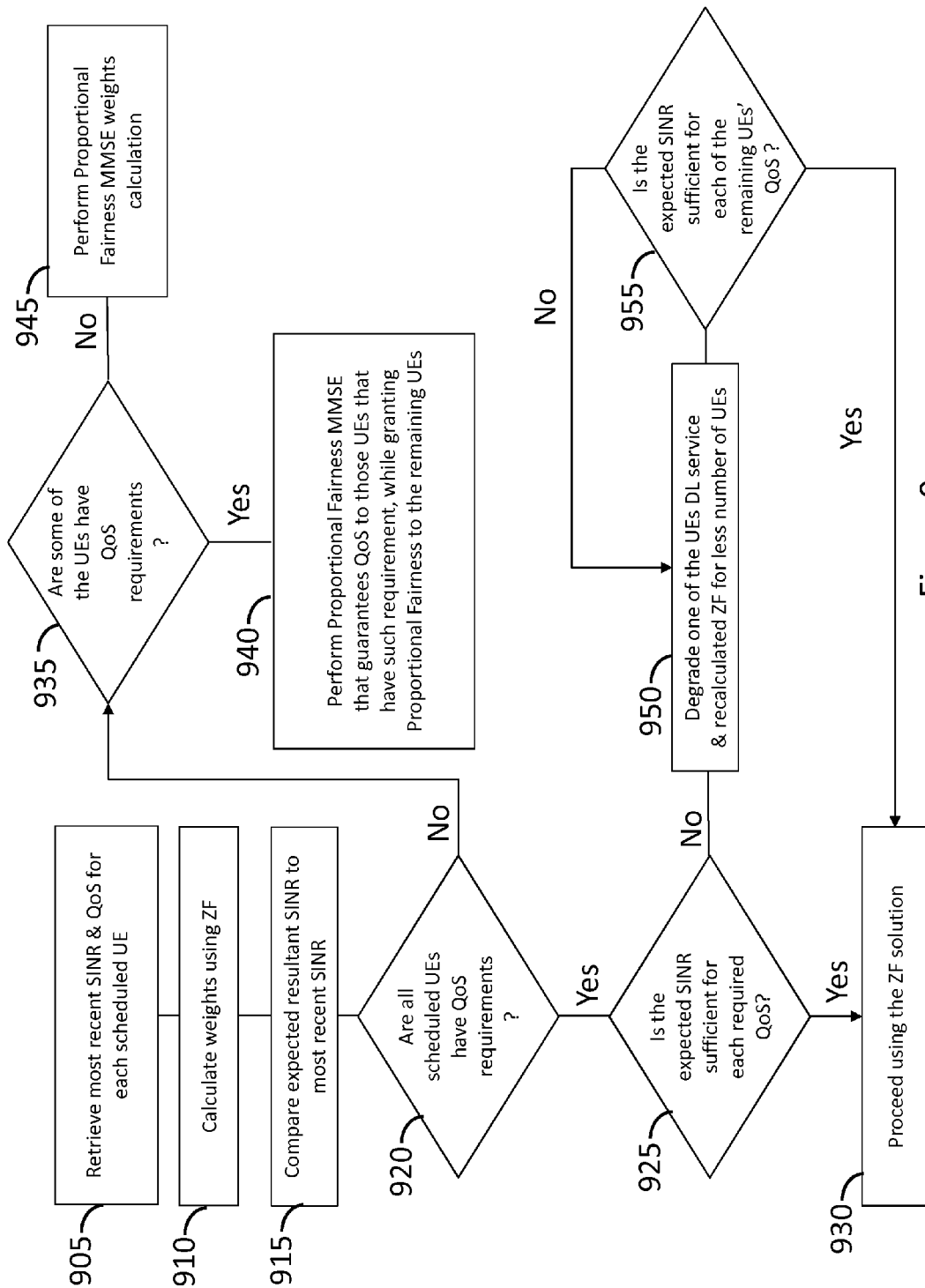
FIG. 9 is a high level flowchart illustrating yet another aspect in accordance with some embodiments of the present invention.

FIG. 9 is a high level flowchart illustrating yet another aspect in accordance with some embodiments of the present invention. The procedure may include the following steps: retrieve most recent SINR and QoS for each scheduled UE 905; Calculate weights using ZF 910; comparing expected resultant SINR to most recent SINR 915; checking whether all scheduled UEs have QoS requirements 920; in case yes— checking whether the expected SINR sufficient for each required QoS 925; in case yes—proceed using the zero forcing (ZF) solution. In case not all scheduled UEs have QoS requirements 920—checking whether some of the UEs have QoS requirements is carried out 935 in case no—Perform Proportional Fairness MMSE weights calculation 945. In case yes—Perform Proportional Fairness MMSE that guarantees QoS to those UEs that have such requirement, while granting Proportional Fairness to the remaining UEs 940.

After checking whether the expected SINR sufficient for each required QoS 925, if the answer is no, degrade one of the UEs DL service and recalculated ZF for less number of UEs 950 and then checking whether the expected SINR sufficient for each of the remaining UEs' QoS 955. In case no, it will repeatedly degrade one of the UEs DL service and recalculated ZF for less number of UEs 950 until the expected SINR sufficient for each of the remaining UEs' QoS. When it does, proceeding using the ZF solution is carried out 930. However, in a case that the expected SINR is sufficient for each of the remaining UEs' QoS, proceeding using the ZF solution is carried out 930.

For the case that the co-located basebands would not be modified to communicate with the said coordinator, the said front-end processor may perform MU-MIMO operation by retrieving the active UE's ID and its assigned resource blocks for a TDD system. The MU-MIMO performance may be compromised. The simulation results in 610 and 620 show that the compromise may be insignificant when the number of the antennas/radios is larger than that of basebands (e.g., M>N).

In the above description, an embodiment is an example or implementation of the invention. The various appearances of "one embodiment", "an embodiment" or "some embodiments" do not necessarily all refer to the same embodiments.

Although various features of the invention may be described in the context of a single embodiment, the features may also be provided separately or in any suitable combination. Conversely, although the invention may be described herein in the context of separate embodiments for clarity, the invention may also be implemented in a single embodiment.

Embodiments of the invention may include features from different embodiments disclosed above, and embodiments may incorporate elements from other embodiments disclosed above. The disclosure of elements of the invention in the context of a specific embodiment is not to be taken as limiting their used in the specific embodiment alone.

Furthermore, it is to be understood that the invention can be carried out or practiced in various ways and that the invention can be implemented in embodiments other than the ones outlined in the description above.

The invention is not limited to those diagrams or to the corresponding descriptions. For example, flow need not move through each illustrated box or state, or in exactly the same order as illustrated and described.

Meanings of technical and scientific terms used herein are to be commonly understood as by one of ordinary skill in the art to which the invention belongs, unless otherwise defined.

While the invention has been described with respect to a limited number of embodiments, these should not be construed as limitations on the scope of the invention, but rather as exemplifications of some of the preferred embodiments. Other possible variations, modifications, and applications are also within the scope of the invention. Accordingly, the scope of the invention should not be limited by what has thus far been described, but by the appended claims and their legal equivalents.

The invention claimed is:

1. A system comprising:
 a number N co-located single-user multiple input multiple output (SU-MIMO) base stations, each having a number K MIMO rank, wherein said N co-located SU-MIMO base stations are configured to share a common antennas array, and operate over a common frequency band;
 a front-end MIMO processor connected to said N co-located SU-MIMO base stations and further coupleable to said common antennas array; and
 a back-end coordinator configured to assist in optimizing operation of said N co-located SU-MIMO base stations, such that said N co-located SU-MIMO base stations and said front-end MIMO processor implement a multi-user multiple input multiple output (MU-MIMO) base station capable of dynamically separating a coverage area into N*K spatial channels.

2. The system according to claim 1, wherein said base station is operable in a Time Division Duplex (TDD) configuration, wherein each of said N co-located SU-MIMO base stations has an existing SU-MIMO scheduler and wherein said front-end MIMO processor is configured to carry out said dynamic separation based on said existing schedulers.

3. The system according to claim 1, wherein each of said N co-located SU-MIMO base stations comprises an existing radio module, wherein said front-end processor is further configured to carry out on-site, periodic self-calibration on transmit and receive chains of each of said radio modules or antennas, wherein the self-calibration is usable for establishing channel reciprocity, so that uplink channel information is mapped into downlink channel estimation in a time division duplex (TDD) system.

4. The system according to claim 3, wherein said front-end processor is further configured calculate a downlink precoding weights for at least some user equipment (UE), camped on the base station using said uplink channel information, said calibration data, and a MU-MIMO spatial multiplexing algorithm.

5. The system according to claim 1, wherein each of said N co-located SU-MIMO base stations comprises an existing baseband module configured to carry out channel estimation of the channels served by the respective SU-MIMO base stations, and wherein said front-end processor is further configured to carry out channel estimation for all the channels served by said N co-located SU-MIMO base stations.

6. The system according to claim 1, wherein said front-end processor is further configured to: derive identification for each of active user equipment (UE) and map said identifications into respective channel estimations.

7. The system according to claim 6, where the said identification derivation is based on decoding the UE ID in the front end processor and in the respective base station.

8. The system according to claim 1, wherein each of said N co-located SU-MIMO base stations has an existing baseband module configured to detect uplink Physical Resource Block (PRB), each PRB being mappable to a distinct reference of frequency/time bins containing OFDM symbols at a given TTI, wherein said front-end processor is further configured to tag a channel estimation of a user equipment (UE) based on a bin received from said existing baseband modules.

9. The system according to claim 1, wherein said front-end processor is further configured to derive uplink channel information relating to at least some user equipment (UE), wherein said uplink channel estimation is converted to downlink channel information by applying channel reciprocity, and further based on calibration data.

10. The system according to claim 1, wherein a communication link established between each base station's baseband and the front end processor, over which schedulers plans are transferred in advance, to the front end processor, and to the coordinator, using UE ID or UE reference via bin at a given TTI, where said scheduled UEs per TTI, per PRB, are processed by the MU-MIMO mechanism.

11. The system according to claim 1, wherein a communication link between said base stations and the front end processor is used to inform it of a quality of service (QoS) and the signal to interference plus noise (SINR) of each of the scheduled UEs in both down and up links.

12. The system according to claim 1, wherein the MU-MIMO processing takes into account: the quality of service (QoS) and the signal to interference plus noise (SINR) levels of the UEs to be scheduled, and chooses whether to use Zero Forcing or minimal mean square error (MMSE) algorithms for antennae weights calculation.

13. The system according to claim 1, wherein the MU-MIMO uses Zero Forcing whenever signal to interference plus noise SINR levels of the user equipment (UEs) to be scheduled are approximately at generic SINR level, where generic means service that could have been provided solely to one UE.

14. The system according to claim 1, where the MU-MIMO process checks quality of service (QoS) tagging of the scheduled UEs, and if none is set, an MMSE weight calculation is done based on a proportional fairness approach.

15. The system according to claim 1, wherein the MU-MIMO process checks quality of service QoS of the schedules UEs, and if all are tagged for the QoS, a minimal mean square error (MMSE) calculation is performed and prospective SINRs are compared to those required by the various QoS, and if found sufficient, the weights calculation is actually used, and if not, one of the UE's service is degraded, so that the other QoS requirements are fulfilled, and if not a second UEs service is degraded.

16. The system according to claim 1, wherein the MU-MIMO process checks QoS of the schedules UEs, and if some of the UEs are tagged for QoS and some other are not, then the QoS ones take priority, and the non QoS tagged ones are served according to a proportional fairness approach.

17. The system according to claim 1, wherein each of said N co-located SU-MIMO base stations has an existing baseband module, and wherein said back-end coordinator is further configured to receive from said front-end-processor an information regarding poorly separated user equipment (UEs) being UEs that have cross talk higher than a predefined level, and notifies at least one of the existing baseband modules to modify a schedule plan.

18. The system according to claim 1, wherein each of said N co-located SU-MIMO base stations has an existing radio module having a local oscillator, wherein said front-end processor is further configured to phase lock on all said local oscillators, in order to achieve phase coherency, sufficient for beamforming.

19. The system according to claim 1, wherein said front-end processor is further configured to send user equipment (UE) uplink channel information and UE identification to said back-end coordinator for checking and resolving conflicts occurring whenever a crosstalk level exceeds predefined levels by sending an intervening request to the basebands.

20. The system according to claim 19, wherein said intervention is achieved by requesting some schedulers to proceed as planned, while others are requested to refrain from scheduling a given UE for certain PRBs, over a given up and coming Transmission Time Interval (TTI).

21. The system according to claim 1, wherein each of said N co-located SU-MIMO base stations has an existing scheduler and wherein said back-end coordinator is further configured to identify poorly separated UEs the are either static or have low mobility, and handover one or more of them to other base station in the system, and repeat this procedures for other poorly separated UEs, so the occurrence of poorly separated UEs is minimized.

22. The system according to claim 21, such handover events are limited to UEs whose history indicated static position, where history is measure in tens of seconds, and where static is defined as channel estimation variation that has approximately zero mean.

23. The system according to claim 1, wherein the antenna array comprises M antennas, serving N baseband units each supporting K grade MIMO, where $M \geq N*K$, i.e. the baseband population is sparse, thus increasing the MU-MIMO degrees of freedom and promoting higher and better spatial separation.

\* \* \* \* \*